United States Patent
Shin et al.

(10) Patent No.: US 7,340,173 B2
(45) Date of Patent: Mar. 4, 2008

(54) WAVELENGTH DIVISION MULTIPLEXING OPTICAL TRANSMITTER USING FABRY-PEROT LASER

(75) Inventors: Dong-Jae Shin, Suwon-shi (KR);
Dae-Kwang Jung, Suwon-shi (KR);
Jea-Hyuck Lee, Anyang-shi (KR);
Jung-Kee Lee, Suwon-shi (KR);
Jeong-Seok Lee, Anyang-shi (KR);
Seong-Taek Hwang, Pyongtaek-shi (KR); Yun-Je Oh, Yongin-shi (KR)

(73) Assignee: Samsung Electronics Co., Ltd., Maetan-Dong, Yeongtong-Ge, Suwon-Si, Gyeonggi-Do (KR)

( * ) Notice: Subject to any disclaimer, the term of this patent is extended or adjusted under 35 U.S.C. 154(b) by 558 days.

(21) Appl. No.: 10/776,720

(22) Filed: Feb. 11, 2004

(65) Prior Publication Data

US 2004/0234265 A1    Nov. 25, 2004

(30) Foreign Application Priority Data

May 20, 2003    (KR) .................. 10-2003-0032064

(51) Int. Cl.
*H04J 14/02*    (2006.01)
*H04J 14/00*    (2006.01)

(52) U.S. Cl. .......................................... 398/79; 398/43
(58) Field of Classification Search ................ 398/43, 398/49, 79, 84, 87
See application file for complete search history.

(56) References Cited

U.S. PATENT DOCUMENTS 6,842,587 B1*    1/2005    McGhan et al. ............ 398/201

(Continued)

FOREIGN PATENT DOCUMENTS

JP    63-224283    9/1988

(Continued)

OTHER PUBLICATIONS

Kim, Hyun-Deok et al.; "A Low-Cost WDM Source with an ASE Injected Fabry-Perot Semiconductor Laser;" Photonics Technology Letters, vol. 12, Issue 8; Aug. 2000; 3 pgs.

(Continued)

*Primary Examiner*—Jason Chan
(74) *Attorney, Agent, or Firm*—Cha & Reiter, LLC

(57) ABSTRACT

A WDM (Wavelength Division Multiplexing) optical transmitter using a Fabry-Perot laser is disclosed. The WDM optical transmitter includes a light source for outputting incoherent light of a prescribed wavelength bandwidth, a circulator having the first to the third ports, for outputting the incoherent light received at the first port coupled to the light source to the second port, and outputting an optical signal received at the second port to the third port coupled to the external waveguide, a WGR (Waveguide Grating Router) having a multiplexing port (MP) coupled to the second port of the circulator and a plurality of demultiplexing ports (DPs), for performing WD (Wavelength Division) demultiplexing on the incoherent light received at the MP to output WD-demultiplexed signals to the plurality of DPs, and performing WD multiplexing on a plurality of channel signals received at the plurality of DPs to output WD-multiplexed signals to the MP, and a plurality of FB (Fabry-Perot) lasers respectively connected to the DPs of the WGR, each FP laser is comprised of a laser cavity, an antireflection coating layer deposited at one end of the laser cavity facing a corresponding DP, and a high reflection coating layer deposited at the other end of the laser cavity, whereby an optical injection efficiency increases and an influence of reflected light is reduced, resulting in facilitation of a wavelength-locked phenomenon.

13 Claims, 21 Drawing Sheets

U.S. PATENT DOCUMENTS

2001/0004290 A1* 6/2001 Lee et al. .................. 359/124

FOREIGN PATENT DOCUMENTS

| JP | 10-027934 | 1/1998 |
|----|-----------|--------|
| JP | 10-229385 | 8/1998 |
| JP | 2000-022258 | 1/2000 |
| JP | 2000-310800 | 11/2000 |
| JP | 2002-062514 | 2/2002 |
| JP | 2002-270949 | 9/2002 |

OTHER PUBLICATIONS

Shin, D.J. et al.; "155 Mbit/s Transmission Using ASE-Injected Fabry-Perot Laser Diode in WDM-PON Over 70° C Temperature Range;" Electronics Letters, vol. 39, Issue 18; Sep. 2003; 2 pgs.

* cited by examiner

WAVELENGTH DIVISION MULTIPLEXING OPTICAL TRANSMITTER USING FABRY-PEROT LASER

CLAIM OF PRIORITY

This application claims priority to an application entitled "WAVELENGTH DIVISION MULTIPLEXING OPTICAL TRANSMITTER USING FABRY-PEROT LASER," filed in the Korean Intellectual Property Office on May 20, 2003 and assigned Serial No. 2003-32064, the contents of which are hereby incorporated by reference.

BACKGROUND OF THE INVENTION

1. Field of the Invention

The present invention particularly relates to a WDM (Wavelength Division Multiplexing) optical transmitter using a Fabry-Perot laser.

2. Description of the Related Art

Typically, in the realm of WDM light source a number of such sources have been developed including DFB (Distributed FeedBack) laser array, MFL (Multi-Frequency Laser), spectrum-sliced light source, wavelength-locked Fabry-Perot laser with incoherent light, and R-SOA (Reflective Semiconductor Optical Amplifier), etc. The spectrum-sliced light source increasingly evolving performs spectrum-slicing on a broadband optical signal using a WGR (Waveguide Grating Router), and thus provides users with a large number of WDM channels. Therefore, there is no need for the spectrum-sliced light source to use neither a light source of a specific lasing wavelength nor a wavelength stabilizer, etc. Recently, new LEDs (Light Emitting Diode) have proposed: SLD (Super Luminescent Diode), FB (Fabry-Perot) laser, fiber amplifier light source, and ultra-short pulse laser, etc. as a spectrum-sliced light source.

The wavelength-locked Fabry-Perot laser with incoherent light performs spectrum-slicing on a broadband optical signal created from an incoherent light source such as an LED and an optical fiber amplifier light source, using an optical filter or a WGR (Waveguide Grating Router); the spectrum-sliced broadband optical signal is injected into a Fabry-Perot layer having no isolator, which adapts the resultant wavelength-locked signal to a signal transmission mode. If a spectrum-sliced signal of more than a predetermined output level is applied to the Fabry-Perot laser, the Fabry-Perot laser generates only a wavelength equal to that of the received spectrum-sliced signal. The reflective semiconductor optical amplifier (R-SOA) applies incoherent light to the SOA (Semiconductor Optical Amplifier), and adapts the amplified optical signal to a signal transmission mode.

The manufacturing process of the DFP laser array and the MFL is complicated, and elements that select a correct wavelength and stabilize the wavelength so as to implement a WDM scheme are costly. Although an LED and an ultra LED proposed as a spectrum-sliced light source have good optical bandwidth and are low-priced elements, they have low modulation bandwidth and low output level. Therefore, they are appropriate as a light source for use with an upstream signal having a modulation rate lower than that of a downstream signal. Although the Fabry-Perot laser is a low-priced high output element, it has a narrow bandwidth, such that it is impossible to provide a large number of wavelength division channels. In case of modulating and transmitting a spectrum-sliced signal at a high speed, the Fabry-Perot may have performance degradation due to mode partition noise. Although the ultra-short pulse light source has a wide spectrum bandwidth as a light source and has coherent characteristics, it not only has low stability of an oscillated spectrum but also a narrow pulse width of several picoseconds (ps), such that it its implementation is difficult. In lieu of such light sources, a spectrum-sliced fiber amplifier light source has been recently proposed. It provides a user with a large number of wavelength-division high output channels by performing spectrum-slicing on the ASE light created from the optical fiber amplifier. However, this spectrum-sliced light source must use a high-priced external modulator such as a LiNb03 to allow individual channels to transmit different data.

The wavelength-locked Fabry-Perot laser with incoherent light directly modulates a Fabry-Perot laser according to a data signal, resulting in increased economical efficiency of data transmission. However, in order to allow the Fabry-Perot laser to output a wavelength-locked signal suitable for high-speed long distance transmission, a high-output incoherent light signal having a wide bandwidth must be applied to the Fabry-Perot laser device. Further, absent temperature control a slight change in external temperature results in the Fabry-Perot laser changing mode. Therefore, the Fabry-Perot laser escapes from a wavelength equal to that of a received spectrum-sliced signal, such that it cannot be adapted as a WDM light source using a wavelength-locked Fabry-Perot laser. An external temperature controller (i.e., a TEC controller) is indispensable to adapt such a wavelength-locked Fabry-Perot laser as a WDM light source, and there is a need for an additional wavelength stabilization circuit to stabilize the light source and its wavelength, resulting in a high cost assessed to a subscriber. As a result, a WDM passive optical network (PON) is not commercially viable due to the high financial costs assessed to the subscriber. To solve this problem, a wavelength-locked Fabry-Perot laser transmission scheme having no temperature control process must be developed. The reflective semiconductor optical amplifier's (R-SOA) manufacturing process is complex and costly, and has limitations in modulation rate, resulting in difficulty in its commercial use.

In conclusion, the aforementioned conventional wavelength-locked Fabry-Perot laser with incoherent light has a variety of advantages, but it is ineffective under conditions of temperature variation, resulting in difficulty in its commercial use.

SUMMARY OF THE INVENTION

Therefore, the present invention has been developed to solve the above problems, and provides additional advantages, by providing a WDM (Wavelength Division Multiplexing) optical transmitter using a Fabry-Perot laser for maintaining prescribed transmission characteristics irrespective of temperature variation.

Accordingly, the above and other aspects can be accomplished by the provision of a WDM (Wavelength Division Multiplexing) optical transmission apparatus for outputting an optical signal comprising a plurality of channel signals over an external waveguide. It would incorporate: a light source for outputting incoherent light of a prescribed wavelength bandwidth; a circulator having the first to the third ports, for outputting the incoherent light received at the first port to the second port, and outputting an optical signal received at the second port to the third port connected to the external waveguide; a WGR (Waveguide Grating Router) having a multiplexing port (MP) connected to the second port of the circulator; the WGR also has a plurality of demultiplexing ports (DPs), for performing WD (Wavelength Division) demultiplexing on the incoherent light received at the MP. The WGR's WD-demultiplexed signals are outputted via a plurality of DPs, which perform WD multiplexing on a plurality of channel signals received at the plurality of DPs outputting said WD-multiplexed signals to the MP; and a plurality of FB (Fabry-Perot) lasers respectively connected to the DPs of the WGR, each FP laser comprising a laser cavity, an antireflection coating layer deposited at one end of the laser cavity facing a corresponding DP, and a high reflection coating layer deposited at the other end of the laser cavity, whereby an optical injection efficiency increases and an influence of reflected light is reduced, resulting in facilitation of a wavelength-locked phenomenon.

BRIEF DESCRIPTION OF THE DRAWINGS

The above and other aspects, features and other advantages of the present invention will be more clearly understood from the following detailed description when taken in conjunction with the accompanying drawings, in which the same or similar elements are denoted by the same reference numerals even though they are depicted in different drawings.

DETAILED DESCRIPTION OF THE PREFERRED EMBODIMENTS

Now, the preferred embodiments of the present invention will be described in detail with reference to the annexed drawings. To clarify the subject matter of the present invention, a detailed description of known functions and configurations will be omitted.

FIGS. 1 to 3 illustrate the fundamental principle of a WDM optical transmitter using a Fabry-Perot laser in accordance with a preferred embodiment of the present invention.

Figure 1A:
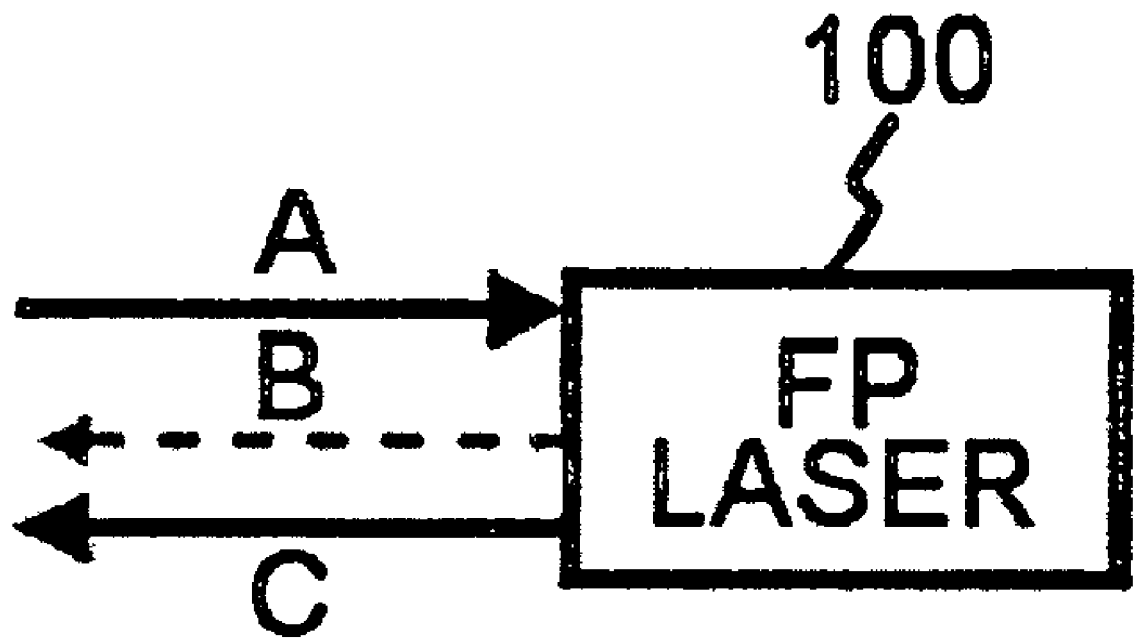
FIGS. 1 to 3 are views illustrating the fundamental principle of a WDM optical transmitter using a Fabry-Perot laser in accordance with a preferred embodiment of the present invention.
Figure 1B:
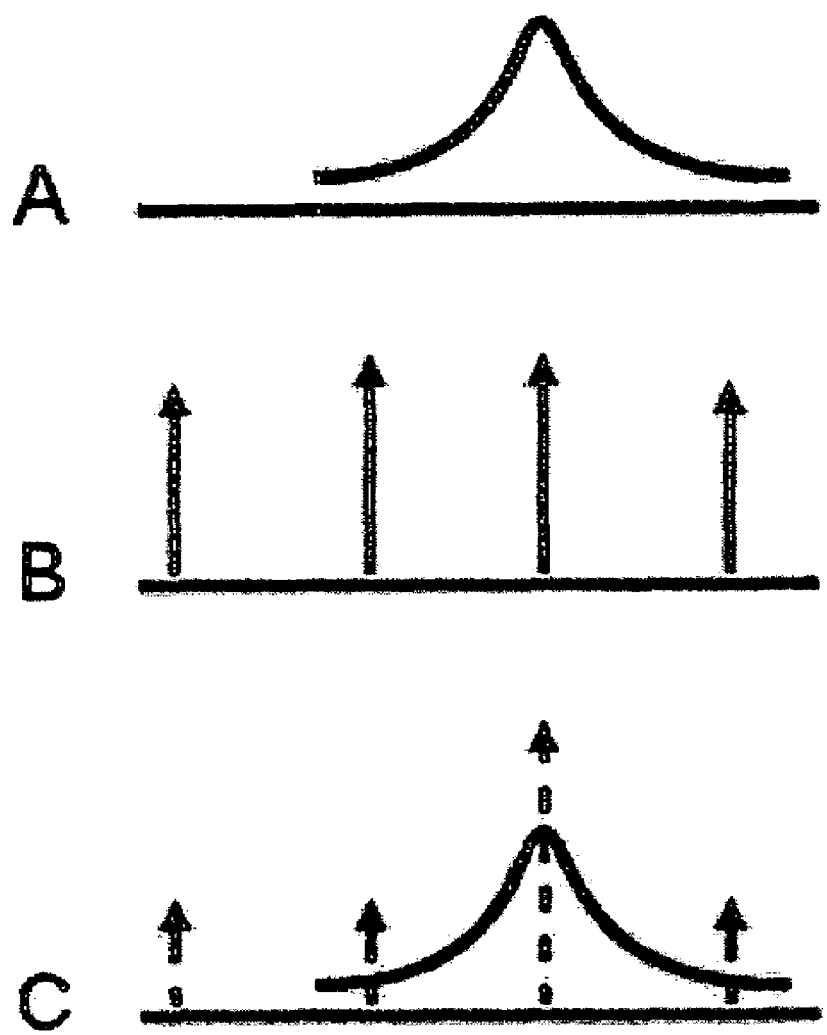

FIGS. 1a~1b illustrate operations of a Fabry-Perot (FP) laser 100 wavelength-locked with incoherent light. FIG. 1A shows a block diagram of the laser and 1B is a signal plot.

The incoherent light "A" applied to the FP laser 100 is created from amplified spontaneous emission sources, and is then spectrum-sliced, resulting in a relatively broad line width. When the FP laser 100 is driven at more than a threshold current, a plurality of lasing modes "B" on the basis of one wavelength is shown at intervals of a predetermined wavelength.

As shown in FIG. 1b, a wavelength of the received incoherent light "A" is identical with one wavelength from among those of the plurality of lasing modes "B", a lasing mode having the identical wavelength is amplified and at the same time the remaining modes other than this lasing mode are limited, such that a prescribed channel "C" is outputted. In more detail, there arises a wavelength-locked phenomenon for enabling the Fabry-Perot laser 100 to function as a single-frequency light source. A wavelength of the received incoherent light "A" is adjusted using such a wavelength-locked phenomenon, such that the wavelength-locked channel signal "C" generated from the FP laser 100 can be selected.

Figure 2A:
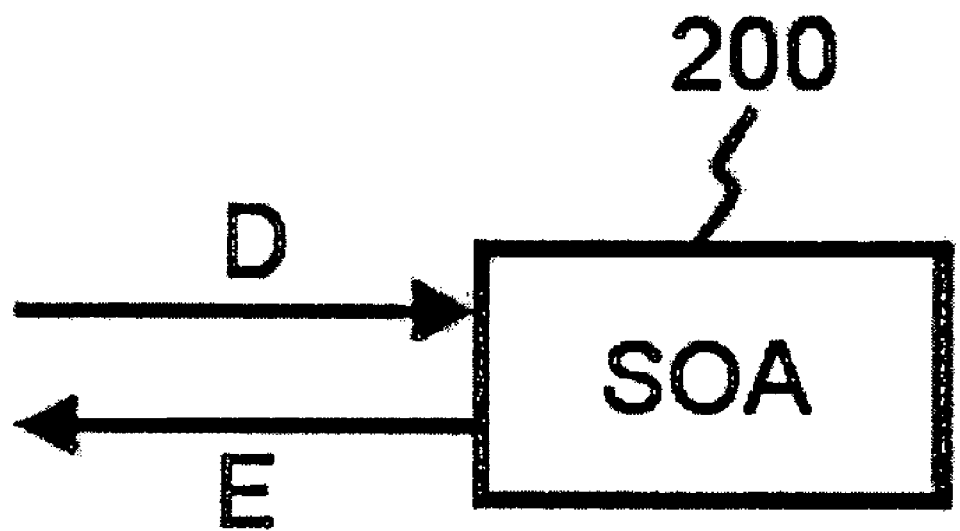
Figure 2B:
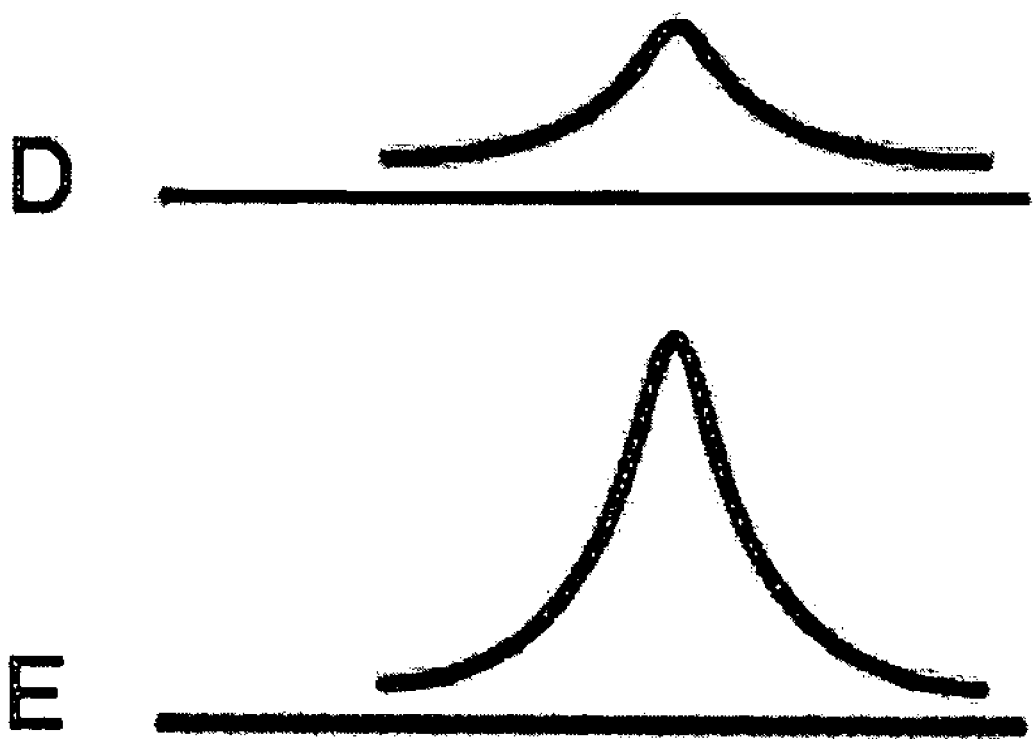

FIGS. 2a~2b are views illustrating a phenomenon for allowing a semiconductor optical amplifier (SOA) 200 to amplify an incoherent light "D". FIG. 2A shows a block diagram of the SOA and 2B is a signal plot.

The SOA 100 includes an antireflection coating layer positioned at one side to receive the incoherent light "D", a high reflection coating layer positioned at the other side, and a laser cavity positioned between both sides. The SOA is designed to allow a gain inside the laser cavity to be higher than an optical loss created at the reflection coating layer and an optical input terminal, thereby generating an incoherent channel signal "E". Hence, the SOA 200 amplifies the received incoherent light "D", thereby generating an incoherent channel signal "E".

Figure 3A:
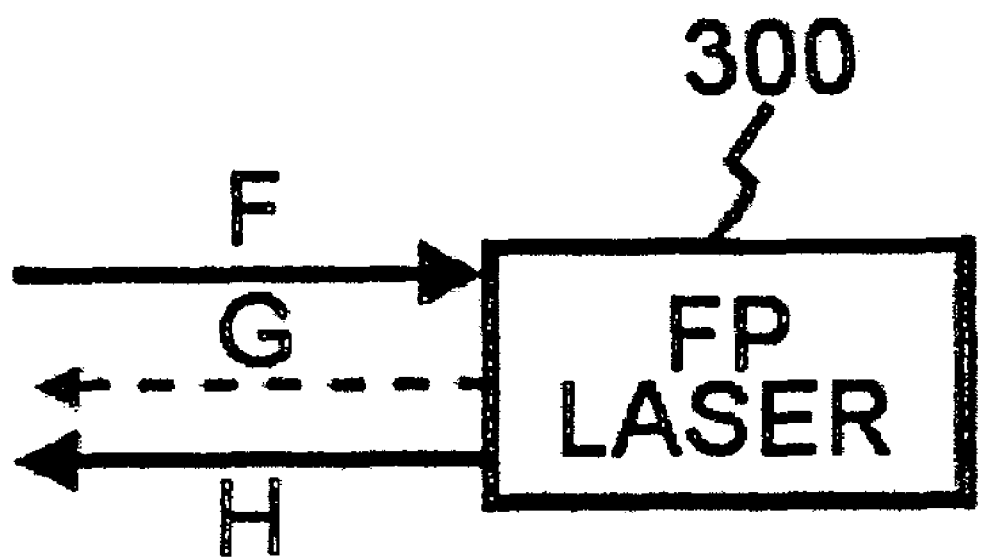
Figure 3B:
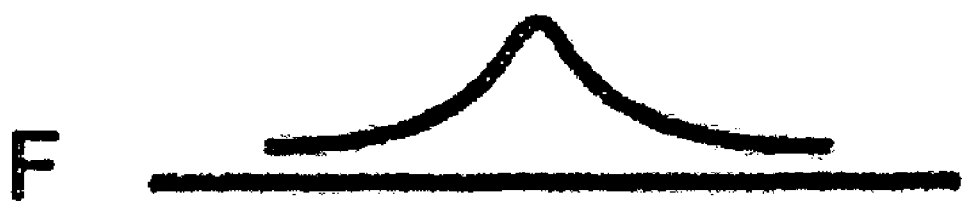
Figure 3B:
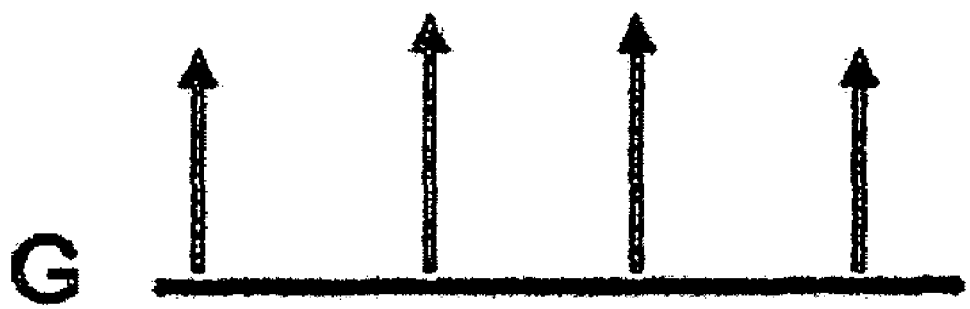
Figure 3B:
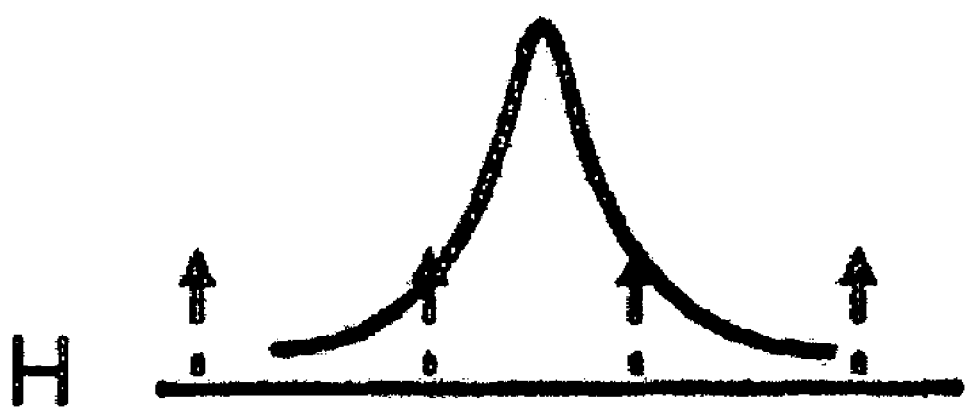

FIGS. 3a~3b are views illustrating a phenomenon for allowing a Fabry-Perot (FP) laser 300 to amplify an incoherent light "F". FIG. 3A shows a block diagram of the laser and 3B is a signal plot.

The FP laser 300 includes a plurality of lasing modes "G", but it does not have a lasing mode corresponding to a wavelength of the incoherent light "F" applied to the FP laser 300. In this case, an optical amplification phenomenon occurs whereas no wavelength-locked phenomenon occurs. In more detail, the Fabry-Perot laser 300 amplifies the received incoherent light "F", and thereby outputs an incoherent channel signal "H" having the same wavelength as the incoherent light "F".

The present invention uses wavelength-locked and optical amplification phenomena of the FP laser, such that it provides a Fabry-Perot laser for maintaining prescribed output characteristics even though a lasing mode changes with temperature. The FP laser according to the present invention generates a wavelength-locked channel signal when a lasing mode having a wavelength equal to that of an injected incoherent light is found. Otherwise, if there is no lasing mode having a wavelength equal to that of the injected incoherent light, the FP laser generates an incoherent channel signal.

Figure 4A:
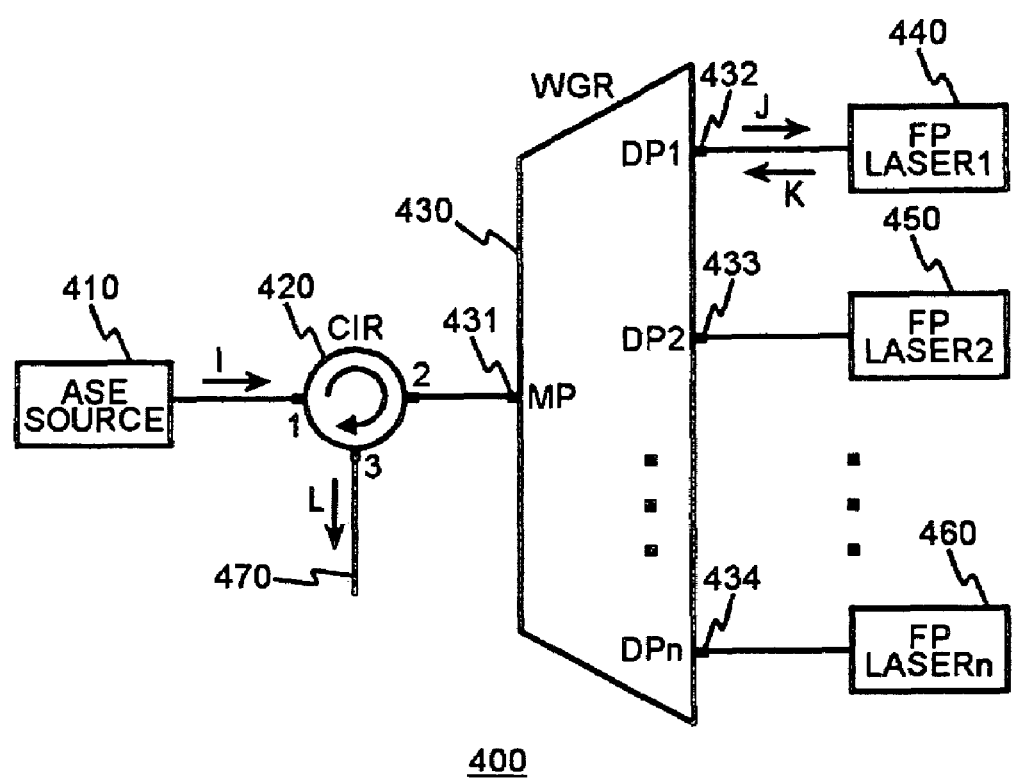
FIGS. 4a~4b are views illustrating a WDM optical transmitter using a Fabry-Perot laser in accordance with a preferred embodiment of the present invention.
Figure 4B:
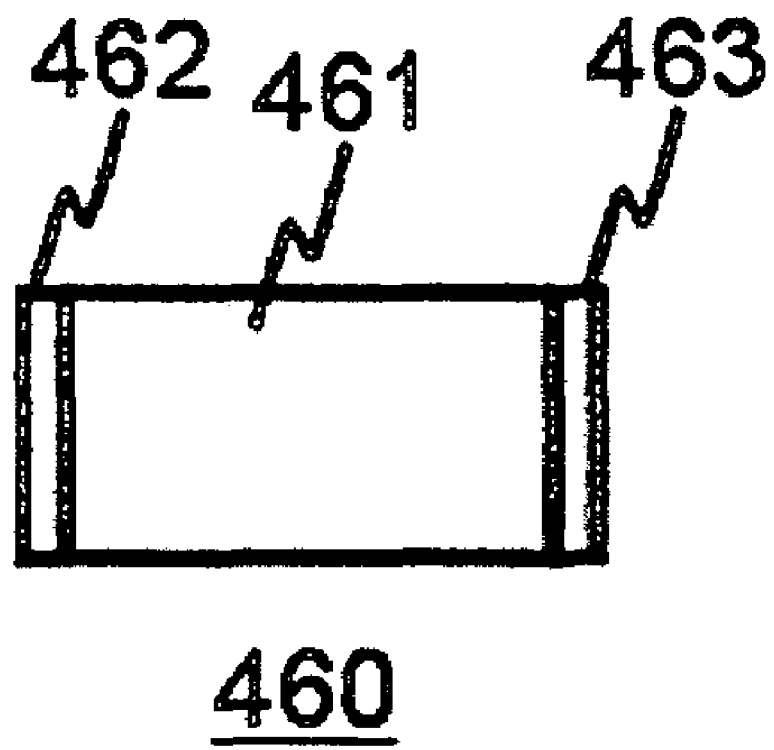

FIG. 4a illustrates a detailed block diagram of a WDM optical transmitter using a FP laser in accordance with a preferred embodiment of the present invention. FIG. 4b depicts a configuration of the FP laser shown in FIG. 4a. Referring to FIGS. 4a~4b, the optical transmitter 400 includes an amplified spontaneous emission (ASE) source 410, a circulator (CIR) 420, a waveguide grating router (WGR) 432, and the first to the N-th FP lasers 440~460.

The ASE source 410 generates an incoherent light "I" having a prescribed wavelength bandwidth, and may include an EDFA (Erbium Doped Fiber Amplifier) for generating an ASE light. The EDFA may include an erbium-doped fiber, and a pump laser diode for pumping the erbium doped fiber.

The circulator 420 includes the first to the third ports 4201~4203. The first port 4201 is connected to the light source 410, the second port 4202 is connected to the WGR 430, and the third port 4203 is connected to an external waveguide 470.

The circulator 420 outputs an incoherent light "I" received at the first port 4201 to the second port 4202, and outputs an optical signal received at the second port 4202 to the third port 4203. The circulator 420 outputs an optical signal received at an upper port to a lower port close to the upper port.

The WGR 430 includes one MP (Multiplexing Port) 431 and the first to the N-th DPs (Demultiplexing Ports) 432~434. The MP 431 is connected to the second port 4202 of the circulator 420. The first to the N-th DPs 432~434 are connected to first to N-th FP lasers 440~460, respectively. The WGR 430 performs WD (Wavelength Division) demultiplexing on the incoherent light "I" applied to the MP 431, and outputs individual WD-demultiplexed incoherent lights "J" to individual DPs 432~434, respectively. The WGR 430 also performs WD-multiplexing on the first to the N-th channel signals "K" respectively received at the first to the N-th DPs 432~434, and outputs a multiplexed optical signal "L" to the MP 431.

First to the N-th FP lasers 440~460 are connected to the first to the N-th DPs 432~434, respectively. The first to the N-th FP lasers 440~460 output a wavelength-locked channel signal "K" when a lasing mode having a wavelength equal to that of a received incoherent light "J" is found. Otherwise, if there is no lasing mode having a wavelength equal to that of the received incoherent light "J", the first to the N-th FP lasers 440~460 output a channel signal "K" amplified by the incoherent light.

The first to the N-th FP lasers 440~460 are identical. The N-th FP laser 460 will hereinafter be described in reference to FIG. 4b.

The N-th FP laser 460 includes a laser cavity 461 having a prescribed gain, an antireflection coating layer 462 deposited at one end of the laser cavity 461 facing the N-th DP 434, and a high reflection coating layer 463 deposited at the other end of the laser cavity 461. The antireflection coating layer 462 has a reflection rate of 0.1~30%, and the high reflection coating layer 463 has a reflection rate of 70~100%. Because the antireflection coating layer 462 has a low reflection rate, the N-th FP laser 460 has the following advantages.

Firstly, because incoherent light reflected from the antireflection coating layer 462 has a low power level, a possibility of combining the received incoherent light with the laser cavity 461 increases and an optical power of the incoherent light needed for a wavelength-locked operation is reduced, such that the N-th FP laser 460 can use a low-priced ASE light source.

Secondly, the incoherent light reflected from the N-th FP laser 460 causes noise. This noise is minimized using the antireflection coating layer 462, and an extinction ratio of the N-th FP laser 460 increases.

Thirdly, when an optical amplification phenomenon occurs instead of a wavelength-locked phenomenon, an optical loss created at the antireflection coating layer 462 is reduced, resulting in increased amplification efficiency. Further, the N-th FP laser can maintain prescribed transmission characteristics irrespective of a lasing mode variation due to temperature variation.

Fourthly, the antireflection coating layer 462 increases individual output rates of the high reflection coating layer 463 and the antireflection coating layer 462 to reduce an optical loss of the high reflection coating layer 463. A reflection rate of the antireflection coating layer 462 is higher than that of an antireflection coating layer of the SOA. The SOA needs a reflection rate of less than 0.1% at its antireflection coating layer to limit a lasing phenomenon of the laser cavity. A typical method for implementing such an SOA consists of having a tilted waveguide manufactured by a complicated fabrication process, and a precise multiple anti-reflection coating layer is deposited at one end of the tilted waveguide. However, the N-th FP laser 460 need not limit the lasing phenomenon to the inside of the laser cavity, such that it has a typical waveguide configuration and can be easily implemented with a relatively simple antireflection coating layer.

FIGS. 5~11b are graphs illustrating operation principles of the WDM optical transmitter 400 shown in FIG. 4a in accordance with a preferred embodiment of the present invention.

Figure 5:
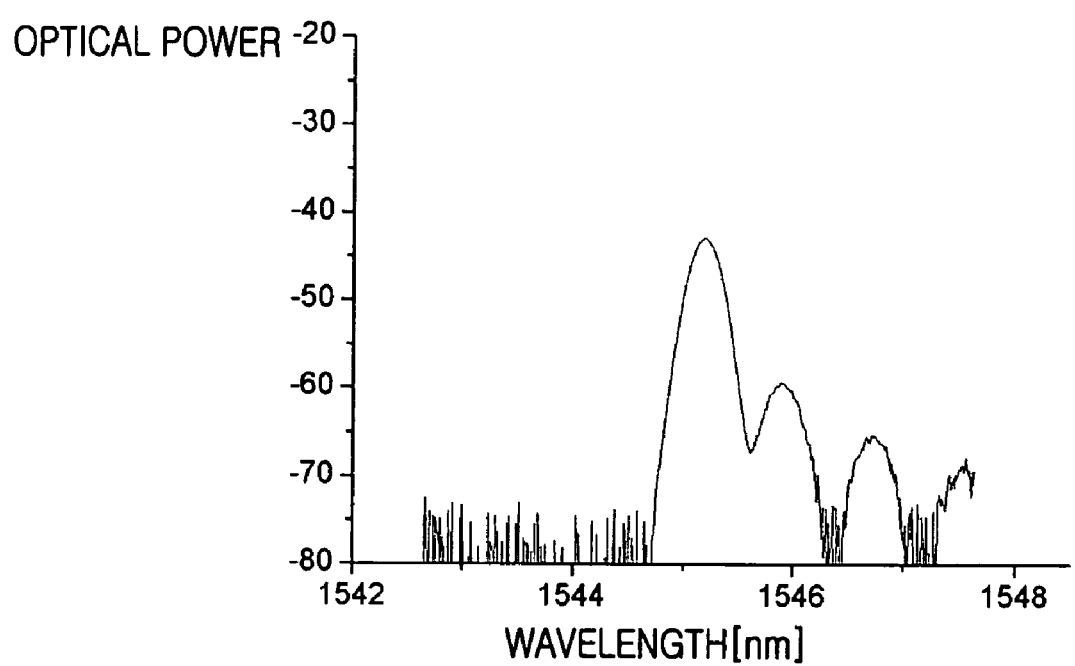
FIGS. 5~11b are graphs illustrating an operation principle of the WDM optical transmitter shown in FIG. 4a in accordance with a preferred embodiment of the present invention.

FIG. 5 is a plot illustrating a spectrum waveform of an incoherent light "J" traveling from the first DP 432 of the WGR 430 to the first FP laser 440. A 3 dB line width of the incoherent light "J" is determined by output characteristics of the WGR 430, and typically corresponds to about 40% of a channel spacing of the WGR 430.

Figure 6A:
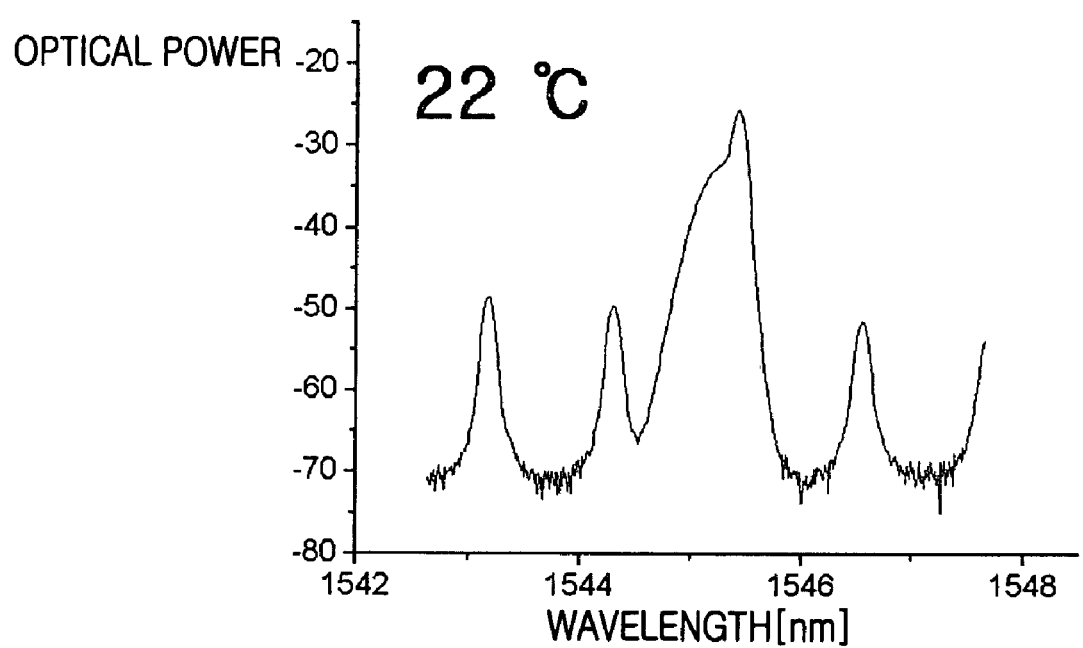
Figure 6B:
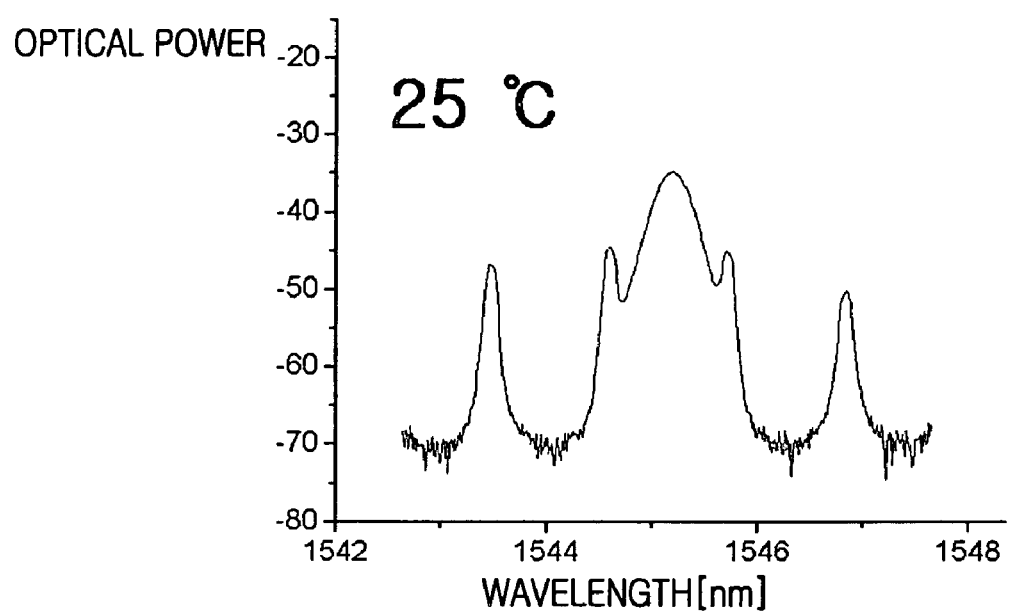
Figure 7A:
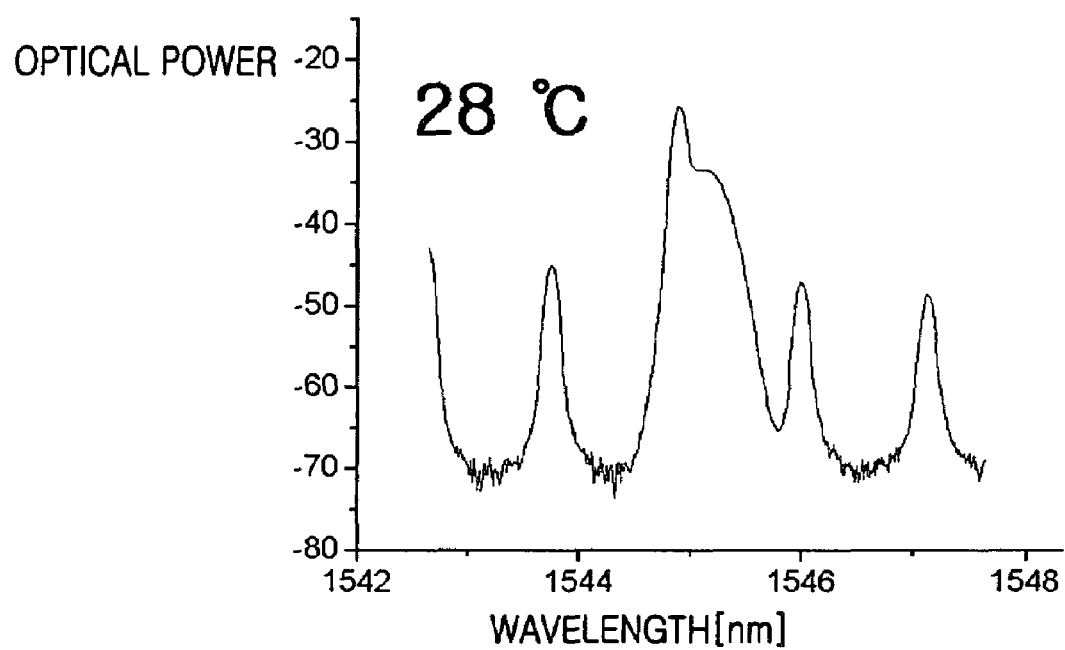
Figure 7B:
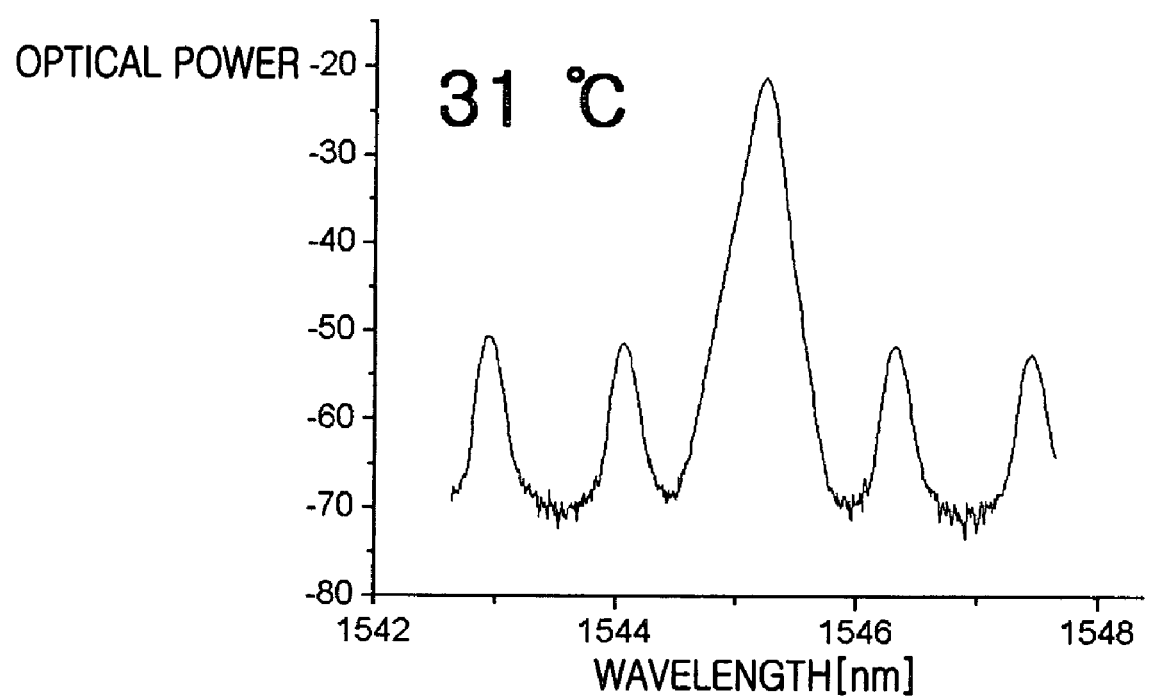
Figure 8A:
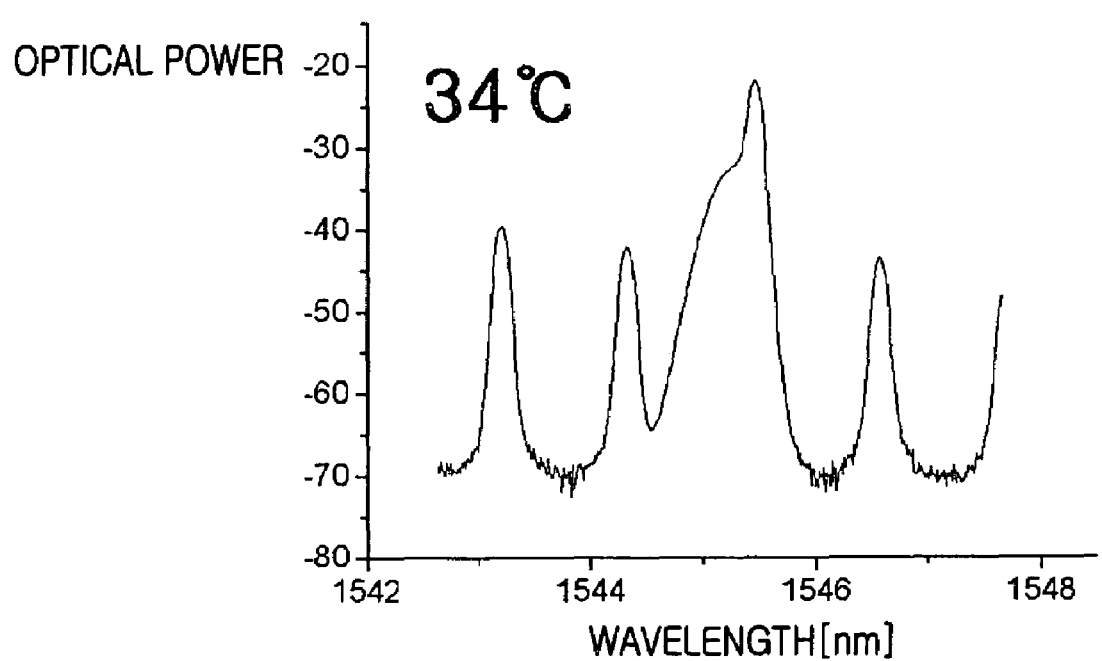
Figure 8B:
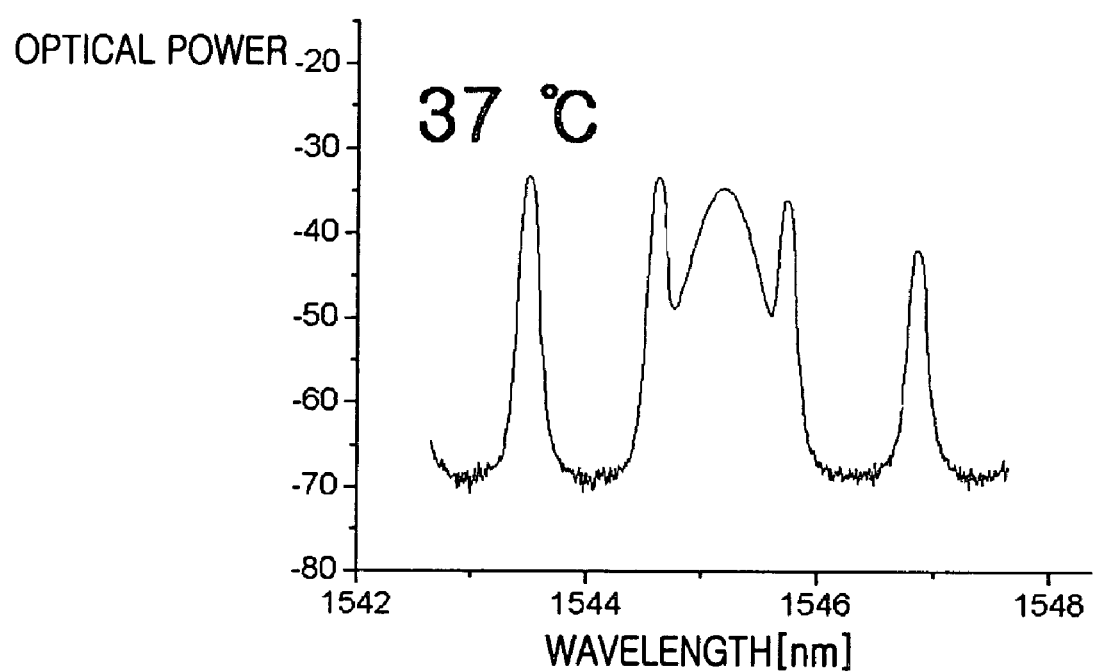

FIGS. 6a to 8b are plots illustrating spectrum variation waveforms of the first channel signal "K" traveling from the first FP laser 440 to the first DP 432 of the WGR 430 according to a surrounding temperature variation. The spectrum waveform shown in FIG. 6a is created at a prescribed surrounding temperature of 22° C.; that of FIG. 6b is created at a prescribed surrounding temperature of 25° C.; that of FIG. 7a is created at a prescribed surrounding temperature of 28° C. The spectrum waveform shown in FIG. 7b is created at a prescribed surrounding temperature of 31° C.; that of FIG. 8a is created at a prescribed surrounding temperature of 34° C. and that of FIG. 8b is created at a prescribed surrounding temperature of 37° C.

The first FP laser 440 has a variation of about 0.1 nm/° C. in wavelengths of lasing modes changing with temperature. In this case, the incoherent light "J" received at the first FP laser 440 has a fixed wavelength. Overlapping a spectrum of the incoherent light "J" with spectrums of lasing modes creates spectrums changing with the surrounding temperature. As can be seen from the drawings, a wavelength-locked phenomenon occurs when a surrounding temperature is set to about 31° C. An optical amplification phenomenon occurs when a surrounding temperature is set to about 25° C. or 37° C.

Figure 9A:
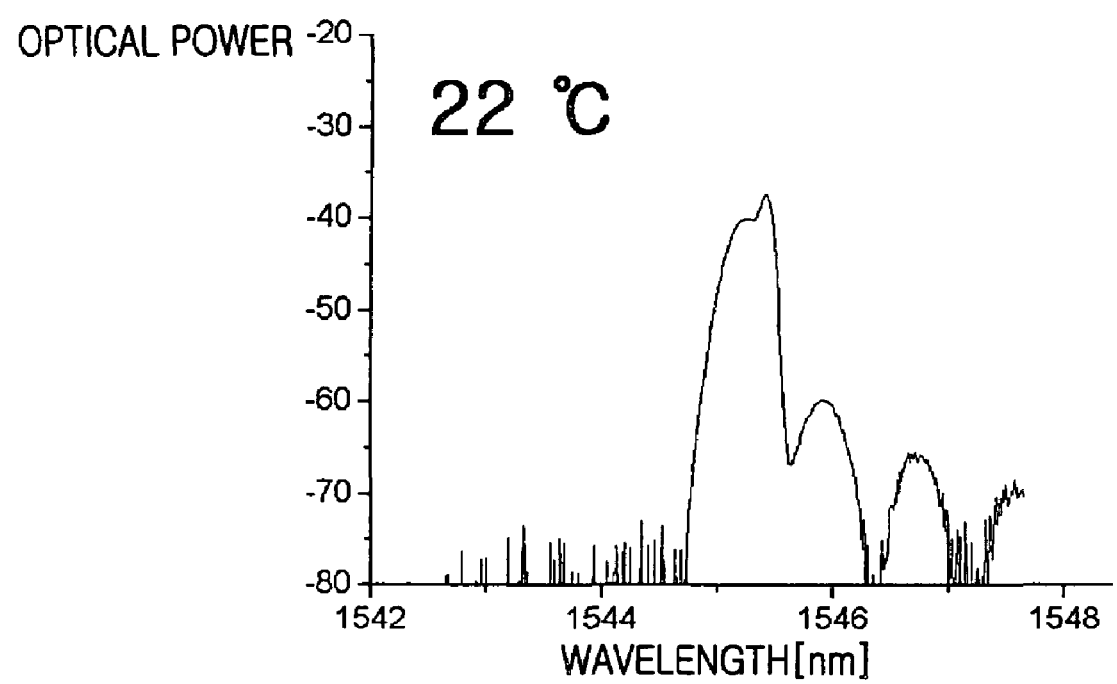
Figure 9B:
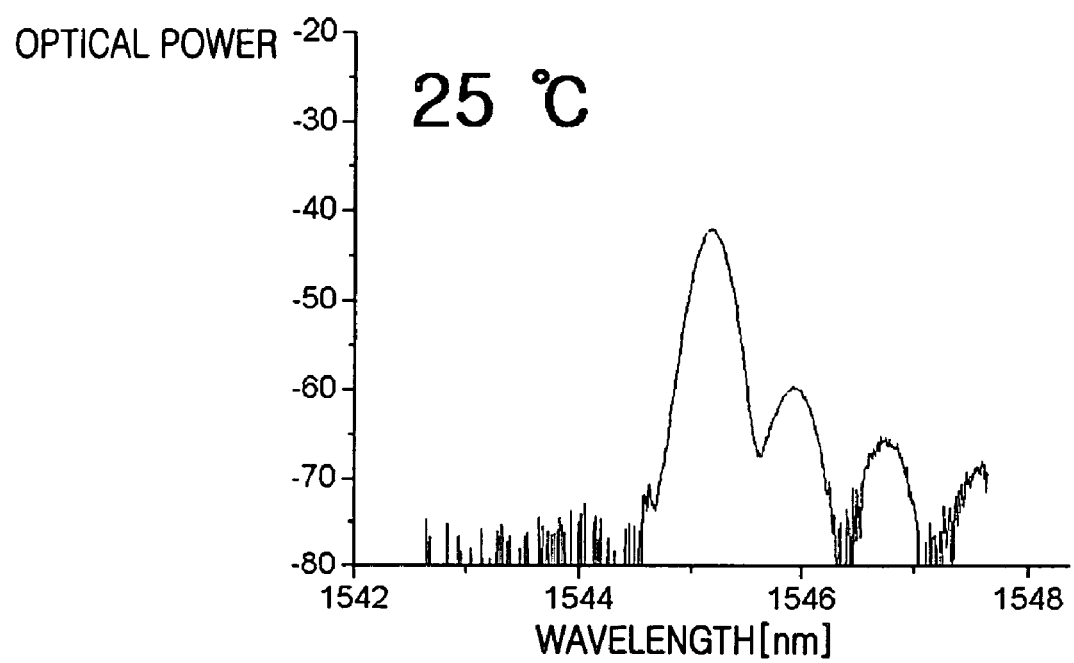
Figure 10A:
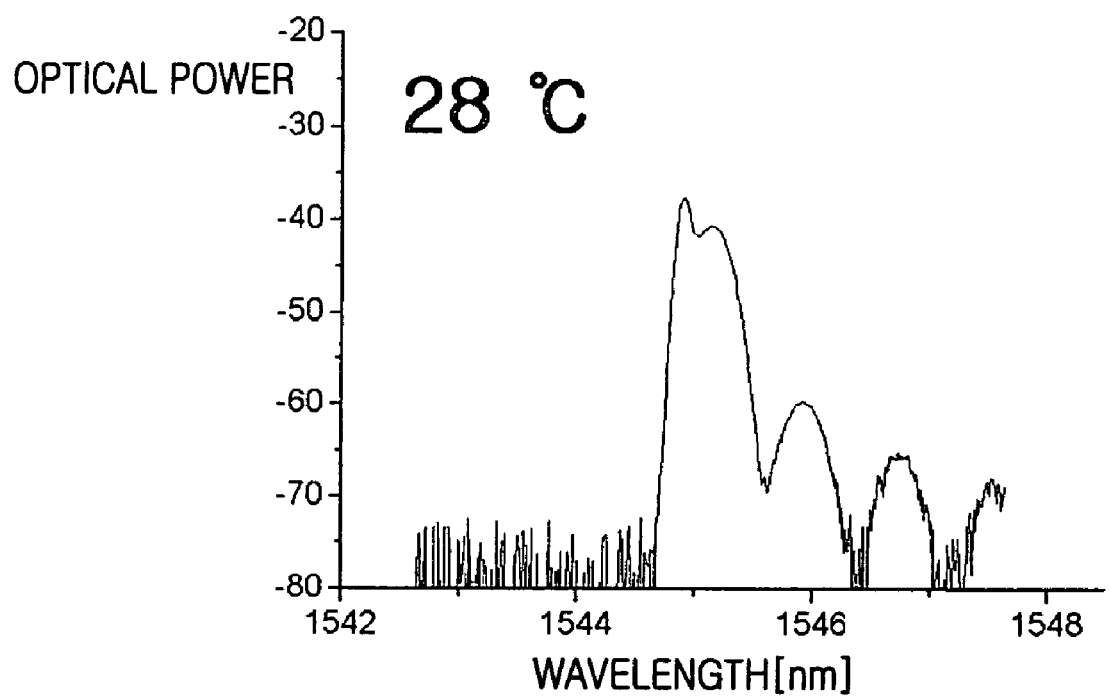
Figure 10B:
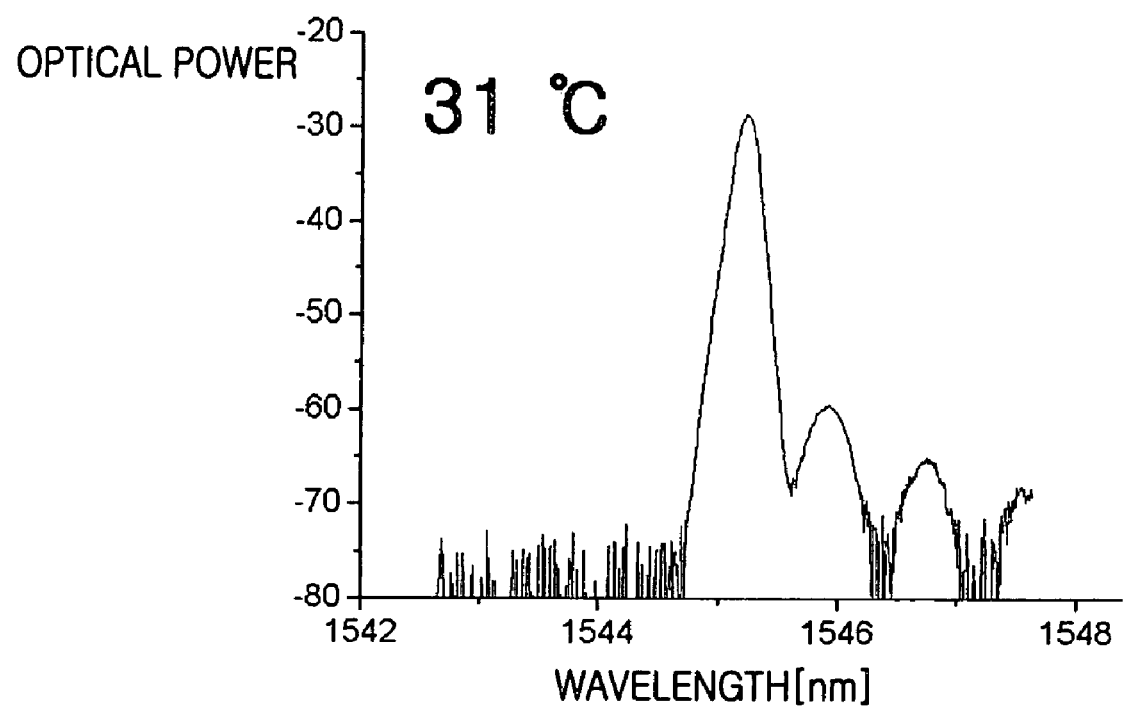
Figure 11A:
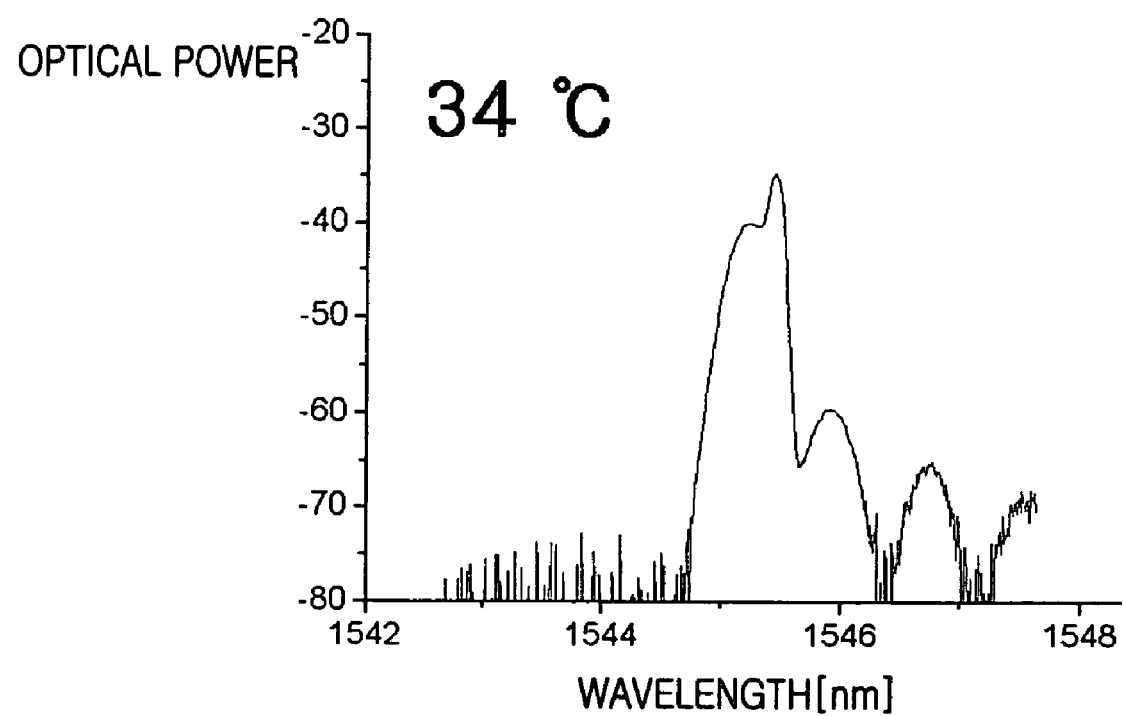
Figure 11B:
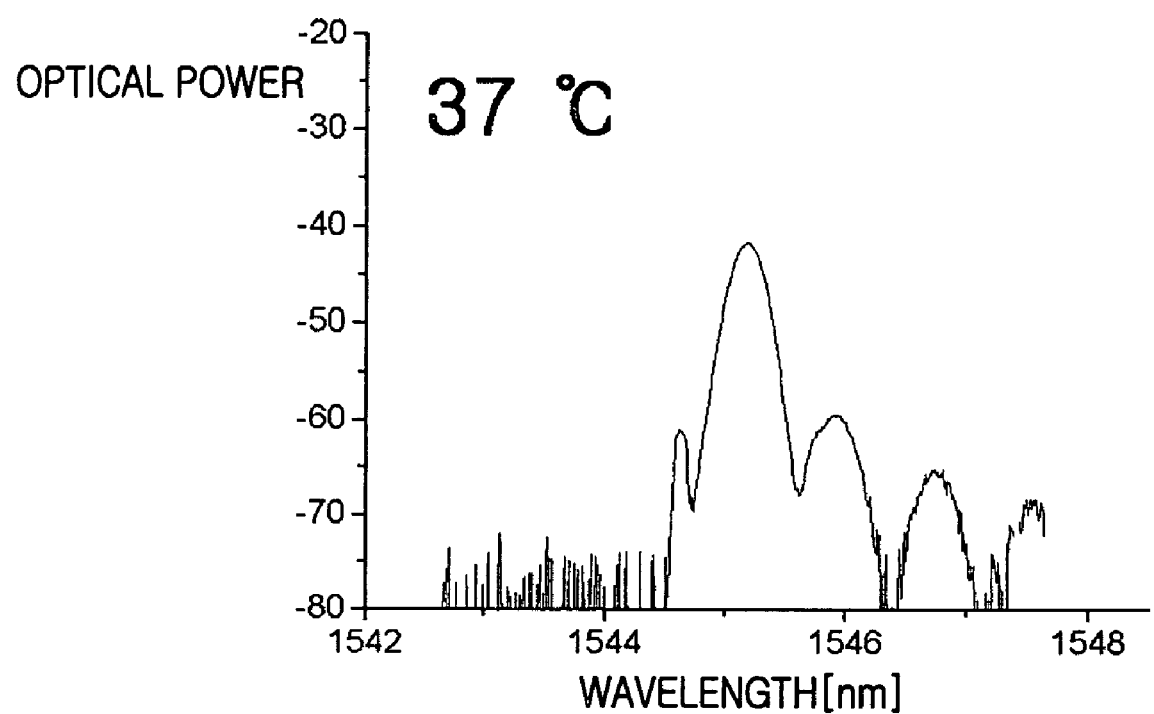

FIGS. 9a to 11b are plots illustrating spectrum variation waveforms of the first channel signal "L" traveling from the first FP laser 440 to an external optical fiber 470 via the WGR 430 and the circulator 420 according to a surrounding temperature variation. The spectrum waveform shown in FIG. 9a is created at an ambient temperature of 22° C., that in FIG. 9b at 25° C., that in FIG. 10a at 28° C., and that in FIG. 10b at 31° C. The spectrum waveform shown in FIG. 11a is created at an ambient temperature of 34° C., that in FIG. 11b at 37° C. FIG. 10b shows a spectrum waveform of a wavelength-locked first channel "L". FIGS. 9b to 11b show spectrum waveforms of the incoherent first channel "L".

As may be apparent from the above description, a WDM optical transmitter using a Fabry-Perot laser comprises: an antireflection coating layer and a high reflection coating layer according to the present invention which increases the optical injection efficiency, and reduces the influence of reflected light, resulting in the facilitation of the wavelength-locked phenomenon.

In addition, because the WDM optical transmission uses both the wavelength-locked and the optical amplification phenomena of the FP laser, it maintains prescribed transmission characteristics irrespective of temperature variations, and has no difficulty in its commercial use.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A WDM (Wavelength Division Multiplexing) optical transmission apparatus for outputting an optical signal having a plurality of channel signals over an external waveguide, comprising:
   a light source for outputting incoherent light of a prescribed wavelength bandwidth;
   a circulator having first to third ports for outputting the incoherent light received at the first port coupled to the light source to the second port and for outputting an optical signal received at the second port to the third port coupled to the external waveguide;
   a WGR (Waveguide Grating Router) having a multiplexing port (MP) coupled to the second port of the circulator and a plurality of demultiplexing ports (DPs) for performing WD (Wavelength Division) demultiplexing on the incoherent light received at the MP to output WD-demultiplexed signals to the plurality of DPs and for performing WD multiplexing on a plurality of channel signals received at the plurality of DPs to output WD-multiplexed signals to the MP; and
   a plurality of FB (Fabry-Perot) lasers respectively connected to the DPs of the WGR, each FP laser having a laser cavity, an antireflection coating layer deposited at one end of the laser cavity facing a corresponding DP, and a high reflection coating layer deposited at the other end of the laser cavity,
   wherein an optical injection efficiency increases and an influence of reflected light is reduced, resulting in facilitation of a wavelength-locked phenomenon, and wherein the antireflection coating layer has a reflection rate of 0.1~30% and the high reflection coating layer has a reflection rate of 70~100%.

2. The apparatus as set forth in claim 1, wherein the FP lasers each output a wavelength-locked optical signal when a lasing mode having a wavelength equal to that of an injected incoherent light is found.

3. The apparatus as set forth in claim 2, wherein the FP lasers output an optical signal amplified by the injected light when there is no lasing mode having a wavelength equal to that of the injected incoherent light.

4. The apparatus as set forth in claim 2 wherein said FP laser noise immunity increases as its extinction ratio increases.

5. The apparatus as act forth in claim 2, wherein a 3-db line width of the incoherent light corresponds to about 40% of a channel spacing of the WGR.

6. The apparatus as set forth in claim 2, wherein the light source further comprises a semiconductor optical amplifier (SOA) to amplify an incoherent light.

7. The apparatus as set forth in claim 1, wherein the light source comprises an Amplified Spontaneous Emission (ASE) source for generating an incoherent light having a prescribed wavelength bandwidth.

8. The apparatus as set forth in claim 7, wherein said ASE comprises an Erbium Doped Fiber Amplifier (EDFA) for generating an ASE light.

9. The apparatus as set forth in claim 8, wherein said EDFA comprises an erbium-doped fiber.

10. The apparatus as set forth in claim 9, wherein said EDFA further comprises a pump laser diode for pumping the erbium doped fiber.

11. The apparatus as set forth in claim 1, wherein each of the FP lasers has a variation of about 0.1 nm/° C. in wavelengths of lasing modes changing with temperature.

12. The apparatus as set forth in claim 11, wherein a wavelength-locked phenomenon occurs at an ambient temperature of about 31° C.

13. The apparatus as set forth in claim 12, wherein an optical amplification occurs at ambient temperatures of 25° C. and 37° C.

* * * * *